United States Patent
Bermel

(10) Patent No.: US 7,686,987 B2
(45) Date of Patent: *Mar. 30, 2010

(54) POLYCARBONATE FILMS PREPARED BY COATING METHODS

(75) Inventor: Marcus S. Bermel, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/099,053

(22) Filed: Apr. 5, 2005

(65) Prior Publication Data

US 2005/0170156 A1    Aug. 4, 2005

Related U.S. Application Data

(62) Division of application No. 10/189,677, filed on Jul. 3, 2002, now abandoned.

(60) Provisional application No. 60/381,931, filed on May 20, 2002.

(51) Int. Cl.
*B29D 7/01* (2006.01)
*B29D 11/00* (2006.01)

(52) U.S. Cl. .......... 264/1.34; 264/1.6; 264/1.7; 264/171.1; 264/173.11; 264/204; 264/205; 264/212; 264/213; 264/216; 427/358; 427/384; 427/407.1; 427/420

(58) Field of Classification Search .......... None
See application file for complete search history.

(56) References Cited

U.S. PATENT DOCUMENTS

| | | | |
|---|---|---|---|
| 2,173,304 A | 9/1939 | Land et al. | |
| 2,237,567 A | 4/1941 | Land | |
| 2,445,555 A | 7/1948 | Binda | |
| 2,761,791 A | 9/1956 | Russell | |
| 3,508,947 A | 4/1970 | Hughes | |
| 4,022,944 A * | 5/1977 | Bottenbruch et al. | 428/220 |
| 4,113,360 A | 9/1978 | Baur et al. | |
| 4,113,903 A * | 9/1978 | Choinski | 427/420 |
| 4,327,121 A | 4/1982 | Gray | |
| 4,340,621 A * | 7/1982 | Matsumiya et al. | 427/294 |
| 4,348,238 A | 9/1982 | Krall | |
| 4,427,741 A | 1/1984 | Aizawa et al. | |
| 4,569,863 A | 2/1986 | Koepke et al. | |

(Continued)

FOREIGN PATENT DOCUMENTS

DE    269391    6/1989

(Continued)

OTHER PUBLICATIONS

Japanese Patent Abstract 2000-047012.

(Continued)

*Primary Examiner*—Jeffrey Wollschlager
(74) *Attorney, Agent, or Firm*—J. Lanny Tucker

(57) ABSTRACT

A method of film fabrication is taught that uses a coating and drying apparatus to fabricate resin films suitable for optical applications. In particular, polycarbonate films are prepared by simultaneous application of multiple liquid layers to a moving carrier substrate. After solvent removal, the polycarbonate films are peeled from the sacrificial carrier substrate. Polycarbonate films prepared by the current invention exhibit good dimensional stability and low birefringence.

29 Claims, 5 Drawing Sheets

U.S. PATENT DOCUMENTS

| | | | |
|---|---|---|---|
| 4,571,316 A * | 2/1986 | Naruse et al. | 264/447 |
| 4,572,849 A * | 2/1986 | Koepke et al. | 427/402 |
| 4,584,231 A | 4/1986 | Knoop | |
| 4,591,512 A | 5/1986 | Racich et al. | |
| 4,604,425 A | 8/1986 | Ohmura et al. | |
| 4,617,207 A | 10/1986 | Ueki et al. | |
| 4,664,859 A | 5/1987 | Knoop | |
| 4,818,624 A | 4/1989 | Downey, Jr. | |
| 4,895,769 A | 1/1990 | Land et al. | |
| 4,913,760 A | 4/1990 | Benson et al. | |
| 4,952,457 A | 8/1990 | Cartier et al. | |
| 5,077,912 A * | 1/1992 | Ogawa et al. | 34/422 |
| 5,219,510 A | 6/1993 | Machell et al. | |
| 5,256,357 A | 10/1993 | Hayward | |
| 5,366,682 A | 11/1994 | Morikawa et al. | |
| 5,478,518 A | 12/1995 | Taketani et al. | |
| 5,514,466 A | 5/1996 | Yamada et al. | |
| 5,516,557 A * | 5/1996 | Willnow et al. | 427/358 |
| 5,561,180 A | 10/1996 | Taketani et al. | |
| 5,573,842 A | 11/1996 | Gutweiler | |
| 5,611,985 A | 3/1997 | Kobayashi | |
| 5,639,589 A * | 6/1997 | Bauer et al. | 430/532 |
| 5,641,544 A * | 6/1997 | Melancon et al. | 427/331 |
| 5,645,766 A | 7/1997 | Shiro et al. | |
| 5,695,694 A | 12/1997 | Iwata et al. | |
| 5,743,980 A | 4/1998 | Hsieh et al. | |
| 5,753,140 A | 5/1998 | Shigemura | |
| 5,759,449 A | 6/1998 | Shiro et al. | |
| 5,771,321 A | 6/1998 | Stern | |
| 5,818,559 A | 10/1998 | Yoshida | |
| 5,849,363 A * | 12/1998 | Yapel et al. | 427/420 |
| 5,909,314 A | 6/1999 | Oka et al. | |
| 5,925,289 A | 7/1999 | Cael et al. | |
| 5,925,769 A | 7/1999 | Connolly et al. | |
| 5,928,726 A * | 7/1999 | Butler et al. | 427/261 |
| 5,928,857 A * | 7/1999 | Geisler et al. | 430/619 |
| 5,958,305 A | 9/1999 | Shiro et al. | |
| 5,965,321 A | 10/1999 | Taylor et al. | |
| 5,973,834 A | 10/1999 | Kadaba et al. | |
| 6,060,183 A | 5/2000 | Higashi et al. | |
| 6,197,989 B1 | 3/2001 | Furakawa et al. | |
| 6,222,003 B1 | 4/2001 | Hosoi et al. | |
| 6,245,382 B1 | 6/2001 | Shvartsman et al. | |
| 6,262,788 B1 | 7/2001 | Hanrahan et al. | |
| 6,512,562 B1 | 1/2003 | Kobayashi et al. | |
| 6,534,114 B2 * | 3/2003 | Bermel et al. | 427/8 |
| 6,579,569 B2 * | 6/2003 | Bermel et al. | 427/402 |
| 6,582,789 B1 | 6/2003 | Sumi | |
| 6,649,104 B2 | 11/2003 | Tadokoro et al. | |
| 6,654,085 B1 | 11/2003 | Koike et al. | |
| 6,696,140 B2 | 2/2004 | Suzuki | |
| 2001/0039319 A1 | 11/2001 | Harita et al. | |
| 2002/0001700 A1 | 1/2002 | Sanefuji | |
| 2002/0131172 A1 | 9/2002 | Hayashi et al. | |
| 2002/0150722 A1 | 10/2002 | Suzuki | |
| 2003/0214715 A1 | 11/2003 | Bermel | |
| 2003/0215582 A1 | 11/2003 | Bermel | |
| 2003/0215583 A1 | 11/2003 | Bermel | |
| 2003/0215608 A1 | 11/2003 | Bermel | |
| 2003/0215621 A1 | 11/2003 | Bermel | |
| 2003/0215658 A1 | 11/2003 | Bermel | |
| 2004/0058813 A1 | 3/2004 | Suzuki | |

FOREIGN PATENT DOCUMENTS

| | | |
|---|---|---|
| EP | 0 154 108 | 9/1985 |
| EP | 0 481 273 | 9/1991 |
| EP | 0 531 568 | 9/1991 |
| EP | 0 531 569 | 9/1991 |
| EP | 0 488 369 | 6/1992 |
| EP | 0 539 099 A2 | 4/1993 |
| EP | 0 656 285 A1 | 6/1995 |
| EP | 0 667 541 A2 | 8/1995 |
| EP | 0 951 057 A1 | 10/1999 |
| JP | 59-047268 | 3/1984 |

OTHER PUBLICATIONS

Surfactants: Static and Dynami Surface Tension by Y.M. Tricot, "Liquid Film Coating, Scientific Principles and Their Technological Implications", pp. 99-136, Edited by: S.F. Kisler & P.M. Schweizer, Chapman & Hall, 1997.
Japanese Patent Abstract 7-186163.
Japanese Patent Abstract 3-252625.
Japanese Patent Abstract 05-059310.
Japanese Patent Abstract 57-059961.
Japanese Patent Abstract 59-047268.
Japanese Patent Abstract 9-216241.
Japanese Patent Abstract 62-229205.
Japanese Patent Abstract 11-254594.
Japanese Patent Abstract 2002-090541.
Japanese Patent Abstract 62-064514.
Japanese Patent Abstract 10-080231.
Japanese Patent Abstract 11-005851.
Solvent film casting—a versatile technology for specialty films, Ulrich Siemann, Luigi Borla, LOFO High Tech Film GmbH, D-79576 Weil am Rhein, Germany, pp. 1-4, Feb. 19, 2001, DRS/bo.
Surfactants: Static and Dynamic Surface Tension by Y.M. Tricot in Liquid Film Coating, pp. 99-136, SE Kistler and PM Schweitzer, Editors, Chapman and Hall (1997).
Handbook of Plastics, Elastomers and Composites, CA Harper Editor, McGraw-Hill, Inc. (2000), pp. 6.66-8.
Japanese Patent Abstract 5-064821.
Japanese Patent Abstract 63-13100.
Japanese Patent Abstract 9-52240.
Japanese Patent Abstract 61-005986.

* cited by examiner

POLYCARBONATE FILMS PREPARED BY COATING METHODS

CROSS REFERENCE TO RELATED APPLICATIONS

This is a Divisional of application Ser. No. 10/189,677, filed Jul. 3, 2002 now abandoned which is a 111A Application of Provisional Application Ser. No. 60/381,931, filed on May 20, 2002.

FIELD OF THE INVENTION

This invention relates generally to methods for manufacturing resin films and, more particularly, to an improved method for the manufacture of optical films, and most particularly, to the manufacture of polycarbonate films used as substrates, polarizer plates, compensation plates, and protective covers in optical devices such as light filters, liquid crystal displays and other electronic displays.

BACKGROUND OF THE INVENTION

Polycarbonates (PC) are used to produce films that are noted for their transparency, mechanical strength, and thermal stability. As a result, polycarbonate films have a number of optical applications. In particular, transparent polycarbonate films have recently been suggested for use as protective covers for light polarizers, as polarizer sheets, as compensation plates, and as electrode substrates in optical displays. In this regard, polycarbonate films are intended to replace glass and less stable polymeric films to produce lightweight, flexible optical display screens. These display screens may be utilized in liquid crystal displays, OLED (organic light emitting diode displays, and in other electronic displays found in, for example, personal computers, televisions, cell phones, and instrument panels.

Polymers of the polycarbonate type are available in a variety of molecular weights as well as in numerous permutations around the basic molecular structure. Common to all polycarbonates are the carbonate linkages and usually the presence of stabilizing phenyl groups (Ph) in the polymer backbone. In terms of commercially significant polycarbonates, the condensation product of the dihydridic phenol, 2,2-bis-(4-hydroxyphenyl)-propane (Bisphenol-A), with a carbonate precursor such as phosogene forms a polymer having recurring units of $-O-Ph-C(CH_3)_2-Ph-O-CO-$. Polycarbonates of the Bisphenol-A type are both readily available and relatively inexpensive.

In general, resin films are prepared either by melt extrusion methods or by casting methods. Melt extrusion methods involve heating the resin until molten (approximate viscosity on the order of 100,000 cp), and then applying the hot molten polymer to a highly polished metal band or drum with an extrusion die, cooling the film, and finally peeling the film from the metal support. For many reasons, however, films prepared by melt extrusion are generally not suitable for optical applications. Principal among these is the fact that melt extruded films exhibit a high degree of optical birefringence. In the case of polycarbonate polymer, there is the additional problem of melting the polymer. Polycarbonate films have exceptionally high melting temperatures of approximately 230° C. and may require very high processing temperature in excess of 300° C. At these high temperatures, polycarbonates are vulnerable to hydrolysis and discoloration. For these reasons, melt extrusion methods are generally not suitable for fabricating many resin films, including polycarbonate films intended for optical applications. Rather, casting methods are generally used to produce these films.

Resin films for optical applications are manufactured almost exclusively by casting methods. Casting methods involve first dissolving the polymer in an appropriate solvent to form a dope having a high viscosity on the order of 50,000 cp, and then applying the viscous dope to a continuous, highly polished metal band or drum through an extrusion die, partially drying the wet film, peeling the partially dried film from the metal support, and conveying the partially dried film through an oven to more completely remove solvent from the film. Cast films typically have a final dry thickness in the range of 40-200 µm. In general, thin films of less than 40 µm are very difficult to produce by casting methods due to the fragility of wet film during the peeling and drying processes. Films having a thickness of greater than 200 µm are also problematic to manufacture due to difficulties associated with the removal of solvent in the final drying step. Although the dissolution and drying steps of the casting method add complexity and expense, cast films generally have better optical properties when compared to films prepared by melt extrusion methods and problems associated with high temperature processing are avoided.

Examples of optical films prepared by casting methods include: 1.) Polyvinyl alcohol sheets used to prepare light polarizers as disclosed in U.S. Pat. No. 4,895,769 to Land and U.S. Pat. No. 5,925,289 to Cael as well as more recent disclosures in U.S. Patent Applic. Ser. No. 2001/0039319 A1 to Harita and U.S. Patent Applic. Ser. No. 2002/001700 A1 to Sanefuji, 2.) Cellulose triacetate sheets used for protective covers for light polarizers as disclosed in U.S. Pat. No. 5,695,694 to Iwata, 3.) Polycarbonate sheets used for protective covers for light polarizers or for retardation plates as disclosed in U.S. Pat. No. 5,818,559 to Yoshida and U.S. Pat. Nos. 5,478,518 and 5,561,180, both to Taketani, and 4.) Polysulfone sheets used for protective covers for light polarizers or for retardation plates as disclosed in U.S. Pat. No. 5,611,985 to Kobayashi and U.S. Pat. Nos. 5,759,449 and 5,958,305 both to Shiro.

The manufacture of polycarbonate films by the casting method is confounded by abrasion, scratch and wrinkle artifacts that may be created during conveyance of the film as described in U.S. Pat. No. 6,222,003 to Hosoi. These artifacts are created while the film passes over numerous conveyance rollers in the final drying and winding operations of the casting method. To overcome these problems, cast films may contain additives that act as lubricants, may be laminated with a protective sheet, or may have the edges knurled to minimize damage to the polycarbonate film. Alternatively, U.S. Pat. No. 6,222,003B1 to Hosoi discloses a method of creating small irregularities on the surface of the cast polycarbonate film to minimize contact with the conveyance rollers and hence minimize scratching and wrinkling. These small irregularities are said to be formed by the use of non-solvents in the casting dope along with special drying conditions. However, lubricants are known to compromise film clarity. Moreover, lamination and edge knurling devices are expensive and add complexity to the casting process. Finally, the deliberate formation of surface irregularities on a film to be used for optical applications is complicated and undesirable. In general, optical films are preferred to be very smooth with low haze.

Another disadvantage to the casting method is that cast films have significant optical birefringence. Although films prepared by casting methods have lower birefringence when compared to films prepared by melt extrusion methods, birefringence remains objectionably high. For example, cellulose triacetate films prepared by casting methods exhibit in-plane retardation of 7 nanometers (nm) for light in the visible spectrum as disclosed in U.S. Pat. No. 5,695,694 to Iwata. A polycarbonate film prepared by the casting method is disclosed as having an in-plane retardation of 17 nm in U.S. Pat. Nos. 5,478,518 and 5,561,180 both to Taketani. U.S. Patent Application Serial No. 2001/0039319 A1 to Harita claims that color irregularities in stretched polyvinyl alcohol sheets are reduced when the difference in retardation between widthwise positions within the film is less than 5 nm in the original unstretched film. For many applications of optical films, low in-plane retardation values are desirable. In particular, values of in-plane retardation of less than 10 nm are preferred.

Birefringence in cast films arises from orientation of polymers during the manufacturing operations. This molecular orientation causes indices of refraction within the plane of the film to be measurably different. In-plane birefringence is the difference between these indices of refraction in perpendicular directions within the plane of the film. The absolute value of birefringence multiplied by the film thickness is defined as in-plane retardation. Therefore, in-plane retardation is a measure of molecular anisotropy within the plane of the film.

During the casting process, molecular orientation may arise from a number of sources including shear of the dope in the die, shear of the dope by the metal support during application, shear of the partially dried film during the peeling step, and shear of the free-standing film during conveyance through the final drying step. These shear forces orient the polymer molecules and ultimately give rise to undesirably high birefringence or retardation values. To minimize shear and obtain the lowest birefringence films, casting processes are typically operated at very low line speeds of 1-15 m/min as disclosed in U.S. Pat. No. 5,695,694 to Iwata. Slower line speeds generally produce the highest quality films.

Low birefringence polycarbonate films are exceptionally difficult to manufacture. This is due to the fact that polycarbonates are rigid polymers and readily align or orient when exposed to shear forces in the casting process. While polycarbonate films have been prepared with low in-plane retardation using a batch casting method, continuously cast polycarbonate films have objectionably high retardation. For example, although batch-cast polycarbonate films have been described with in-plane retardation values of 4-8 nm, continuous-cast films are considerably higher at 17 nm as disclosed in U.S. Pat. Nos. 5,478,518 and 5,561,180 both to Taketani. Batch casting is primarily a laboratory method for preparing short experimental samples for physical analysis and is not suitable for large-scale manufacture of polycarbonate films.

Another drawback to the casting method is the inability to accurately apply multiple layers. As noted in U.S. Pat. No. 5,256,357 to Hayward, conventional multi-slot casting dies create unacceptably non-uniform films. In particular, line and streak non-uniformity is greater than 5% with prior art devices. Acceptable two layer films may be prepared by employing special die lip designs as taught in U.S. Pat. No. 5,256,357 to Hayward, but the die designs are complex and may be impractical for applying more than two layers simultaneously.

Another drawback to the casting method is the restrictions on the viscosity of the dope. In casting practice, the viscosity of dope is on the order of 50,000 cp. For example, U.S. Pat. No. 5,256,357 to Hayward describes practical casting examples using dopes with a viscosity of 100,000 cp. In general, cast films prepared with lower viscosity dopes are known to produce non-uniform films as noted for example in U.S. Pat. No. 5,695,694 to Iwata. In U.S. Pat. No. 5,695,694 to Iwata, the lowest viscosity dopes used to prepare casting samples are approximately 10,000 cp. At these high viscosity values, however, casting dopes are difficult to filter and degas. While fibers and larger debris may be removed, softer materials such as polymer slugs are more difficult to filter at the high pressures found in dope delivery systems. Particulate and bubble artifacts create conspicuous inclusion defects as well as streaks and may create substantial waste.

In addition, the casting method can be relatively inflexible with respect to product changes. Because casting requires high viscosity dopes, changing product formulations requires extensive down time for cleaning delivery systems to eliminate the possibility of contamination. Particularly problematic are formulation changes involving incompatible polymers and solvents. In fact, formulation changes are so time consuming and expensive with the casting method that most production machines are dedicated exclusively to producing only one film type.

Finally, cast films may exhibit undesirable cockle or wrinkles. Thinner films are especially vulnerable to dimensional artifacts either during the peeling and drying steps of the casting process or during subsequent handling of the film. In particular, the preparation of composite optical plates from resin films requires a lamination process involving application of adhesives, pressure, and high temperatures. Very thin films are difficult to handle during this lamination process without wrinkling. In addition, many cast films may naturally become distorted over time due to the effects of moisture. For optical films, good dimensional stability is necessary during storage as well as during subsequent fabrication of composite optical plates.

SUMMARY OF THE INVENTION

It is therefore an object of the present invention to overcome the limitations of prior art casting methods and provide a new coating method for preparing amorphous polycarbonate films having very low in-plane birefringence.

It is a further object of the present invention to provide a new method of producing highly uniform polycarbonate films over a broad range of dry thicknesses.

Yet another object of the present invention is to provide a method of preparing polycarbonate films by simultaneously applying multiple layers to a moving substrate.

Still another object of the present invention is to provide a new method of preparing polycarbonate films with improved dimensional stability and handling ability by temporarily adhering the polycarbonate film to a supporting carrier substrate at least until it is substantially dry and then subsequently separating the carrier substrate from the polycarbonate film.

A further object of the present invention is to overcome the limitations of the prior art casting method and define a new coating method for preparing resin films without the need for co-solvents, lubricants, or protective laminates as converting aids to minimize scratch and abrasion artifacts.

Briefly stated, the foregoing and numerous other features, objects and advantages of the present invention will become readily apparent upon review of the detailed description, claims and drawings set forth herein. These features, objects and advantages are accomplished by applying a low viscosity fluid containing polycarbonate resin onto a moving carrier substrate by a coating method. The polycarbonate film is not separated from the carrier substrate until the coated film is substantially dry (<10% residual solvent by weight). In fact, the composite structure of polycarbonate film and carrier substrate may be wound into rolls and stored until needed. Thus, the carrier substrate cradles the polycarbonate film and protects against shearing forces during conveyance through the drying process. Moreover, because the polycarbonate film is dry and solid when it is finally peeled from the carrier substrate, there is no shear or orientation of polymer within the film due to the peeling process. As a result, polycarbonate resin films prepared by the current invention are remarkably amorphous and exhibit very low in-plane birefringence.

Polycarbonate films can be made with the method of the present invention having a thickness of about 1 to 500 µm. Very thin polycarbonate films of less than 40 microns can be easily manufactured at line speeds not possible with prior art methods. The fabrication of very thin films is facilitated by a carrier substrate that supports the wet film through the drying process and eliminates the need to peel the film from a metal band or drum prior to a final drying step as required in the casting methods described in prior art. Rather, the polycarbonate film is substantially, if not completely, dried before separation from the carrier substrate. In all cases, dried polycarbonate films have a residual solvent content of less than 10% by weight. In a preferred embodiment of the present invention, the residual solvent content is less than 5%, and most preferably less than 1%. Thus, the present invention readily allows for preparation of very delicate thin films not possible with the prior art casting method. In addition, thick films of greater than 40 µm may also be prepared by the method of the present invention. To fabricate thicker films, additional coatings may be applied over a film-substrate composite either in a tandem operation or in an offline process without comprising optical quality. In this way, the method of the present invention overcomes the limitation of solvent removal during the preparation of thicker films since the first applied film is dry before application of a subsequent wet film. Thus, the present invention allows for a broader range of final film thickness than is possible with casting methods.

In the method of the present invention, polycarbonate films are created by forming a single or, preferably, a multi-layer composite on a slide surface of a coating hopper, the multi-layer composite including a bottom layer of low viscosity, one or more intermediate layers, and an optional top layer containing a surfactant, flowing the multi-layer composite down the slide surface and over a coating lip of the coating hopper, and applying the multi-layer composite to a moving substrate. In particular, the use of the method of the present invention is shown to allow for application of several liquid layers having unique composition. Coating aids and additives may be placed in specific layers to improve film performance or improve manufacturing robustness. For example, multi-layer application allows a surfactant to be placed in the top spreading layer where needed rather than through out the entire wet film. In another example, the concentration of polycarbonate in the lowermost layer may be adjusted to achieve low viscosity and facilitate high-speed application of the multi-layer composite onto the carrier substrate. Therefore, the present invention provides an advantageous method for the fabrication of multiple layer composite films such as required for certain optical elements or other similar elements.

Wrinkling and cockle artifacts are minimized with the method of the present invention through the use of the carrier substrate. By providing a stiff backing for the polycarbonate film, the carrier substrate minimizes dimensional distortion of the polycarbonate resin film. This is particularly advantageous for handling and processing very thin films of less than about 40 microns. Moreover, scratches and abrasion artifacts that are known to be created by the casting method are avoided with the method of the present invention since the carrier substrate lies between the polycarbonate film and potentially abrasive conveyance rollers during all drying operations. Thus, the method of the present invention does not require the use of co-solvents, lubricants or protective laminates as converting aids as are needed in casting operations to minimize abrasion artifacts. In addition, the restraining nature of the carrier substrate also eliminates the tendency of polycarbonate films to distort or cockle over time as a result of changes in moisture levels. Thus, the method of the current invention insures that polycarbonate films are dimensionally stable during preparation and storage as well as during final handling steps necessary for fabrication of optical elements.

In the practice of the method of the present invention it is preferred that the substrate be a discontinuous sheet such as polyethylene terephthalate (PET). The PET carrier substrate may be pretreated with a subbing layer or an electrical discharge device to modify adhesion between the polycarbonate film and the PET substrate. In particular, a subbing layer or electrical discharge treatment may enhance the adhesion between the film and the substrate, but still allow the film to be subsequently peeled away from the substrate.

Although the present invention is discussed herein with particular reference to a slide bead coating operation, those skilled in the art will understand that the present invention can be advantageously practiced with other coating operations. For example, freestanding films having low in-plane retardation should be achievable with single or multiple layer slot die coating operations and single or multiple layer curtain coating operations. Moreover, those skilled in the art will recognize that the present invention can be advantageously practiced with alternative carrier substrates. For example, peeling films having low in-plane birefringence should be achievable with other resin supports [e.g. polyethylene naphthalate (PEN), cellulose acetate, PET], paper supports, resin laminated paper supports, and metal supports (e.g. aluminum).

Practical applications of the present invention include the preparation of polycarbonate sheets used for optical films, laminate films, release films, photographic films, and packaging films among others. In particular, polycarbonate sheets prepared by the method of the present invention may be utilized as optical films in the manufacture of electronic displays such as liquid crystal displays. For example, liquid crystal displays are comprised of a number of film elements including polarizer plates, compensation plates and electrode substrates. Polarizer plates are typically a multi-layer composite structure having dichroic film (normally stretched polyvinyl alcohol treated with iodine) with each surface adhered to a protective cover. The polycarbonate films prepared by the method of the present invention are suitable as protective covers for polarizer plates. The polycarbonate films prepared by the method of the present invention are also suitable for the manufacture of compensation plates and electrode substrates.

The polycarbonate film produced with the method of the present invention is an optical film. As produced, the polycarbonate films made with the method of the present invention will have a light transmittance of at least about 85 percent, preferably at least about 90 percent, and most preferably, at least about 95 percent. Further, as produced, the polycarbonate film will have a haze value of less than 1.0 percent. In addition, the polycarbonate films are smooth with a surface roughness average of less than 100 nm and most preferably with a surface roughness of less than 50 nm

DETAILED DESCRIPTION OF THE INVENTION

Figure 1:
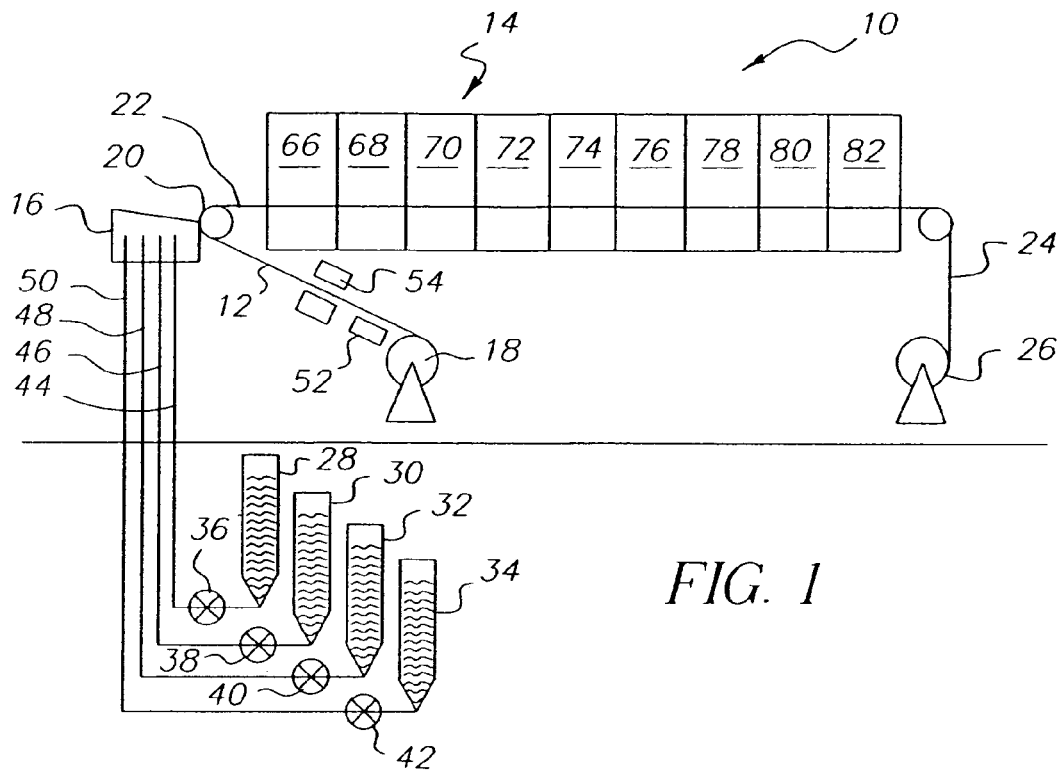
FIG. 1 is a schematic of an exemplary coating and drying apparatus that can be used in the practice of the method of the present invention.

Turning first to FIG. 1 there is shown a schematic of an exemplary and well known coating and drying system 10 suitable for practicing the method of the present invention. The coating and drying system 10 is typically used to apply very thin films to a moving substrate 12 and to subsequently remove solvent in a dryer 14. A single coating apparatus 16 is shown such that system 10 has only one coating application point and only one dryer 14, but two or three (even as many as six) additional coating application points with corresponding drying sections are known in the fabrication of composite thin films. The process of sequential application and drying is known in the art as a tandem coating operation.

Coating and drying apparatus 10 includes an unwinding station 18 to feed the moving substrate 12 around a back-up roller 20 where the coating is applied by coating apparatus 16. The coated web 22 then proceeds through the dryer 14. In the practice of the method of the present invention the final dry film 24 comprising a polycarbonate resin film on substrate 12 is wound into rolls at a wind-up station 26.

As depicted, an exemplary four-layer coating is applied to moving web 12. Coating liquid for each layer is held in respective coating supply vessel 28, 30, 32, 34. The coating liquid is delivered by pumps 36, 38, 40, 42 from the coating supply vessels to the coating apparatus 16 conduits 44, 46, 48, 50, respectively. In addition, coating and drying system 10 may also include electrical discharge devices, such as corona or glow discharge device 52, or polar charge assist device 54, to modify the substrate 12 prior to application of the coating.

Figure 2:
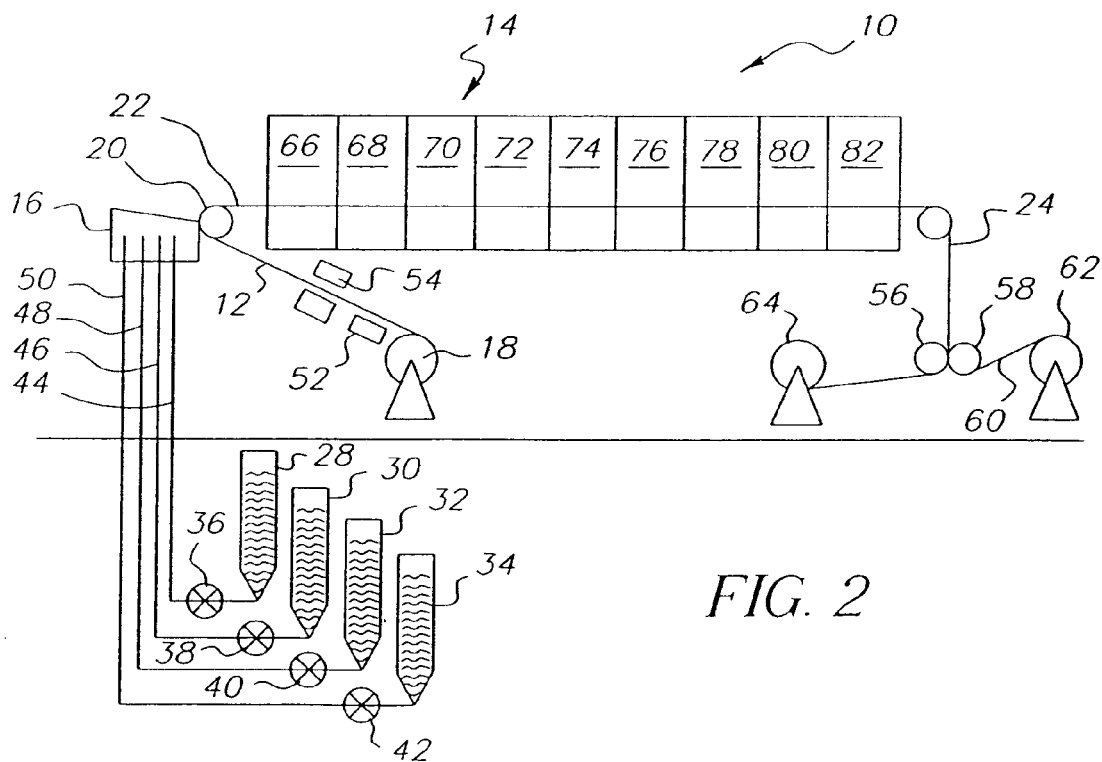
FIG. 2 is a schematic of an exemplary coating and drying apparatus of FIG. 1 including a station where the polycarbonate web separated from the substrate is separately wound.

Turning next to FIG. 2 there is shown a schematic of the same exemplary coating and drying system 10 depicted in FIG. 1 with an alternative winding operation. Accordingly, the drawings are numbered identically up to the winding operation. In the practice of the method of the present invention, the dry film 24 comprising a substrate (which may be a resin film, paper, resin coated paper or metal) with a polycarbonate coating applied thereto is taken between opposing rollers 56, 58. The polycarbonate film 60 is peeled from substrate 12 with the polycarbonate film going to winding station 62 and the substrate 12 going to winding station 64. In a preferred embodiment of the present invention, polyethylene terephthalate (PET) is used as the substrate 12. The substrate 12 may be pretreated with a subbing layer to enhance adhesion of the coated film 60 to the substrate 12.

The coating apparatus 16 used to deliver coating fluids to the moving substrate 12 may be a multi-layer applicator such as a slide bead hopper, as taught for example in U.S. Pat. No. 2,761,791 to Russell, or a slide curtain hopper, as taught by U.S. Pat. No. 3,508,947 to Hughes. Alternatively, the coating apparatus 16 may be a single layer applicator, such as a slot die hopper or a jet hopper. In a preferred embodiment of the present invention, the application device 16 is a multi-layer slide bead hopper.

As mentioned above, coating and drying system 10 includes a dryer 14 that will typically be a drying oven to remove solvent from the coated film. An exemplary dryer 14 used in the practice of the method of the present invention includes a first drying section 66 followed by eight additional drying sections 68-82 capable of independent control of temperature and air flow. Although dryer 14 is shown as having nine independent drying sections, drying ovens with fewer compartments are well known and may be used to practice the method of the present invention. In a preferred embodiment of the present invention the dryer 14 has at least two independent drying zones or sections.

Preferably, each of drying sections 68-82 have independent temperature and airflow controls. In each section, temperature may be adjusted between 5° C. and 150° C. To minimize drying defects from case hardening or skinning-over of the wet polycarbonate film, optimum drying rates are needed in the early sections of dryer 14. There are a number of artifacts created when temperatures in the early drying zones are inappropriate. For example, fogging or blush of polycarbonate films is observed when the temperature in zones 66, 68 and 70 are set at 25° C. This blush defect is particularly problematic when high vapor pressure solvents (methylene chloride and acetone) are used in the coating fluids. Aggressively high temperatures are also associated with other artifacts such as case hardening, reticulation patterns and microvoids in the polycarbonate film. In a preferred embodiment of the present invention, the first drying section 66 is operated at a temperature of at least about 25° C. but less than 95° C. with no direct air impingement on the wet coating of the coated web 22. In another preferred embodiment of the method of the present invention, drying sections 68 and 70 are also operated at a temperature of at least about 25° C. but less than 95° C. It is preferred that initial drying sections 66, 68 be operated at temperatures between about 30° C. and about 60° C. It is most preferred that initial drying sections 66, 68 be operated at temperatures between about 30° C. and about 50° C. The actual drying temperature in drying sections 66, 68 may be optimized empirically within these ranges by those skilled in the art.

Figure 3:
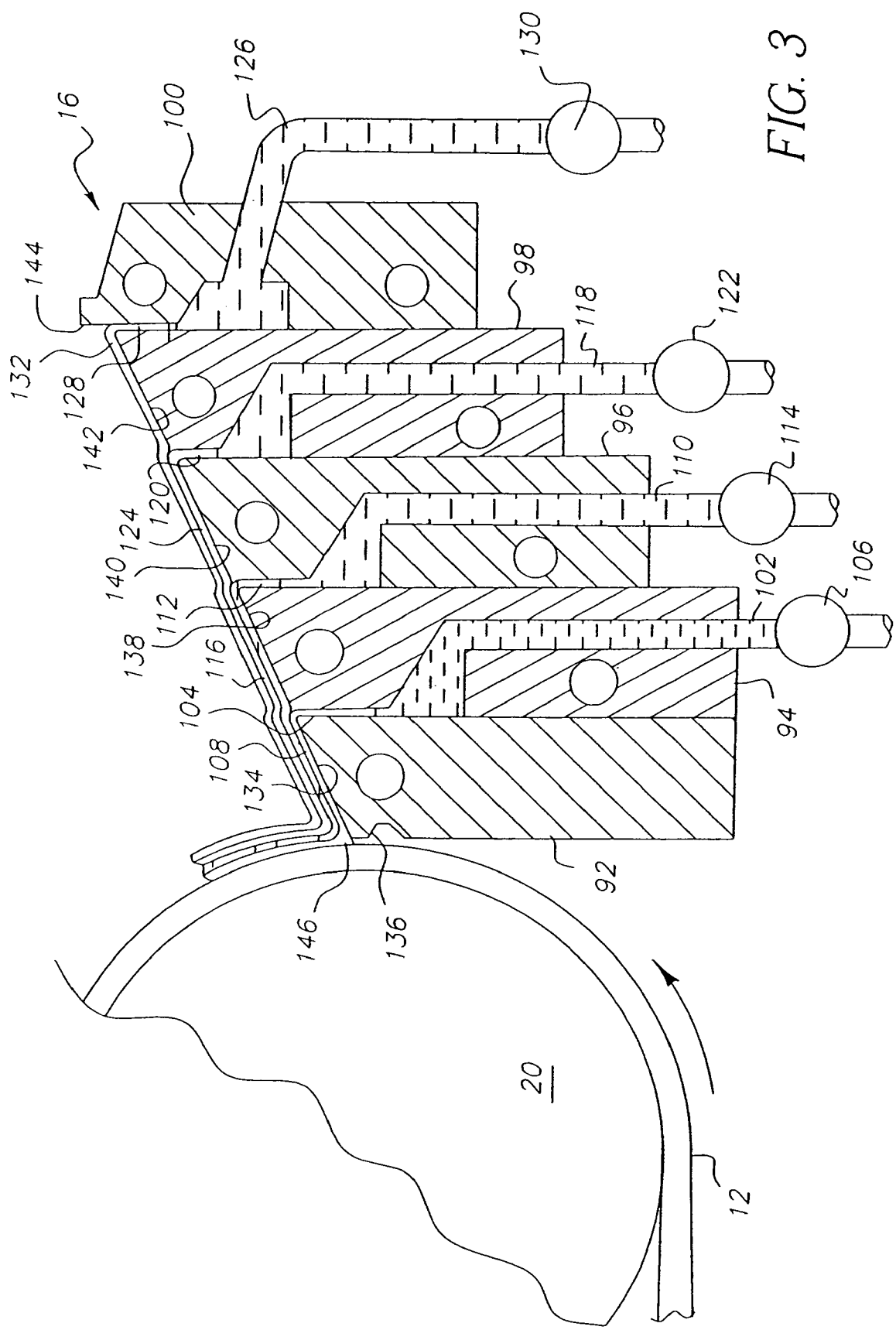
FIG. 3 is a schematic of an exemplary multi-slot coating apparatus that can be used in the practice of the method of the present invention.

Referring now to FIG. 3, a schematic of an exemplary coating apparatus 16 is shown in detail. Coating apparatus 16, schematically shown in side elevational cross-section, includes a front section 92, a second section 94, a third section 96, a fourth section 98, and a back plate 100. There is an inlet 100 into second section 94 for supplying coating liquid to first metering slot 104 via pump 106 to thereby form a lowermost layer 108. There is an inlet 110 into third section 96 for supplying coating liquid to second metering slot 112 via pump 114 to form layer 116. There is an inlet 118 into fourth section 98 for supplying coating liquid to metering slot 120 via pump 122 to form layer 124. There is an inlet 126 into back plate 100 for supplying coating liquid to metering slot 128 via pump 130 to form layer 132. Each slot 104, 112, 120, 128 includes a transverse distribution cavity. Front section 92 includes an inclined slide surface 134, and a coating lip 136. There is a second inclined slide surface 138 at the top of second section 94. There is a third inclined slide surface 140 at the top of third section 96. There is a fourth inclined slide surface 142 at the top of fourth section 98. Back plate 100 extends above inclined slide surface 142 to form a back land surface 144. Residing adjacent the coating apparatus or hopper 16 is a coating back up roller 20 about which a web 12 is conveyed. Coating layers 108, 116, 124, 132 form a multilayer composite which forms a coating bead 146 between lip 136 and substrate 12. Typically, the coating hopper 16 is movable from a non-coating position toward the coating backing roller 20 and into a coating position. Although coating apparatus 16 is shown as having four metering slots, coating dies having a larger number of metering slots (as many as nine or more) are well known and may be used to practice the method of the present invention.

In the method of the present invention, the coating fluids are comprised principally of a polycarbonate resin dissolved in an organic solvent. Polymers of the polycarbonate type are available in a variety of molecular weights as well as in numerous permutations around the basic molecular structure. Common to all polycarbonates are the carbonate linkages and usually the presence of stabilizing phenyl groups (Ph) in the polymer backbone. In terms of commercially significant polycarbonates, the condensation product of the dihydridic phenol, 2,2-bis-(4-hydroxyphenyl)-propane (Bisphenol-A), with a carbonate precursor, such as phosogene or diphenyl carbonate, forms a polymer having recurring units of —O—Ph—C(CH$_3$)$_2$—Ph—O—CO—. Polycarbonates of the Bisphenol-A type are both readily available and relatively inexpensive. Less readily available and more expensive are the numerous polycarbonate co-polymers that may be formed by the addition of various dihydric phenol derivatives during polymer synthesis. Examples of such derivatives are 1,1-bis-(4-hydroxyphenyl)cyclohexane (Bisphenol Z), 1,1-bis-(4-hydroxyphenyl)-3,3,5-trimethyl cyclohexane, 2,2-bis-(3-methyl-4-hydroxyphenyl)propane (Bisphenol C), 1,1-bis-(4-hydroxyphenyl)-1-phenyl ethane (Bisphenol P), bis-(4-hydroxyphenyl)-diphenyl methane, among others. These co-polymeric polycarbonates may be formulated to alter material properties such as thermal stability, impact resistance and the like, while maintaining good optical properties. In the method of the present invention, there are no particular restrictions as to the type of polycarbonate or blend of polycarbonate co-polymers used to form a film. Polycarbonate resins are commercially available from General Electric and Bayer.

In terms of organic solvents for polycarbonates, suitable solvents include, for example, chlorinated solvents (methylene chloride and 1,2 dichloroethane), alcohols (methanol, ethanol, n-propanol, isopropanol, n-butanol, isobutanol, diacetone alcohol, phenol, and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, and n-butyl acetate), aromatics (toluene and xylenes) and ethers (tetrahydrofuran, 1,3-dioxolane, 1,2-dioxolane, 1,3-dioxane, 1,4-dioxane, and 1,5-dioxane). Polycarbonate solutions may be prepared with a blend of the aforementioned solvents. Preferred primary solvents include methylene chloride and 1,3-dioxolane. Preferred co-solvents include toluene, tetrahydrofuran, cyclohexanone, methanol, ethanol, and isopropanol.

Coating fluids may also contain small amounts of plasticizers. Appropriate plasticizers for polycarbonate films include phthalate esters (diethylphthalate, dibutylphthalate, dicyclohexylphthalate, dioctylphthalate, didecylphthalate and butyl octylphthalate), adipate esters (dioctyl adipate), carbonates (dicetyl carbonate and distearyl carbonate) and phosphate esters (tricresyl phosphate and triphenyl phosphate). Plasticizers are normally used to improve the flow characteristics of polycarbonates processed by the melt extrusion method. However, plasticizers may be used here as coating aids in the converting operation to minimize premature film solidification at the coating hopper and to improve drying characteristics of the wet film. In the method of the present invention, plasticizers may be used to minimize blistering, curl and delamination of polycarbonate films during the drying operation. In a preferred embodiment of the present invention, plasticizers may be added to the coating fluid at a total concentration of up to 5% by weight relative to the concentration of polymer in order to mitigate defects in the final polycarbonate film.

Coating fluids may also contain surfactants as coating aids to control artifacts related to flow after coating. Artifacts created by flow after coating phenomena include mottle, repellencies, orange-peel (Bernard cells), and edge-withdraw. Surfactants used control flow after coating artifacts include siloxane and fluorochemical compounds. Examples of commercially available surfactants of the siloxane type include: 1.) Polydimethylsiloxanes such as DC200 Fluid from Dow Corning, 2.) Poly(dimethyl, methylphenyl)siloxanes such as DC510 Fluid from Dow Corning, and 3.) Polyalkyl substituted polydimethysiloxanes such as DC190 and DC1248 from Dow Corning as well as the L7000 Silwet series (L7000, L7001, L7004 and L7230) from Union Carbide, and 4.) Polyalkyl substituted poly(dimethyl, methylphenyl)siloxanes such as SF1023 from General Electric. Examples of commercially available fluorochemical surfactants include: 1.) Fluorinated alkyl esters such as the Fluorad series (FC430 and FC431) from the 3M Corporation, 2.) Fluorinated polyoxyethylene ethers such as the Zonyl series (FSN, FSN100, FSO, FSO100) from Du Pont, 3.) Acrylate: polyperfluoroalkyl ethylacrylates such as the F series (F270 and F600) from NOF Corporation, and 4.) Perfluoroalkyl derivatives such as the Surflon series (S383, S393, and S8405) from the Asahi Glass Company. In the method of the present invention, surfactants are generally of the non-ionic type. In a preferred embodiment of the present invention, non-ionic compounds of either the siloxane or fluorinated type are added to the uppermost layers.

In terms of surfactant distribution, surfactants are most effective when present in the uppermost layers of the multilayer coating. In the uppermost layer, the concentration of surfactant is preferably 0.001-1.000% by weight and most preferably 0.010-0.500%. In addition, lesser amounts of surfactant may be used in the second uppermost layer to minimize diffusion of surfactant away from the uppermost layer. The concentration of surfactant in the second uppermost layer is preferably 0.000-0.200% by weight and most preferably between 0.000-0.100% by weight. Because surfactants are only necessary in the uppermost layers, the overall amount of surfactant remaining in the final dried film is small.

Although surfactants are not required to practice the method of the current invention, surfactants do improve the uniformity of the coated film. In particular, mottle nonuniformities are reduced by the use of surfactants. In transparent polycarbonate films, mottle nonuniformities are not readily visualized during casual inspection. To visualize mottle artifacts, organic dyes may be added to the uppermost layer to add color to the coated film. For these dyed films, nonuniformities are easy to see and quantify. In this way, effective surfactant types and levels may be selected for optimum film uniformity.

Figure 4:
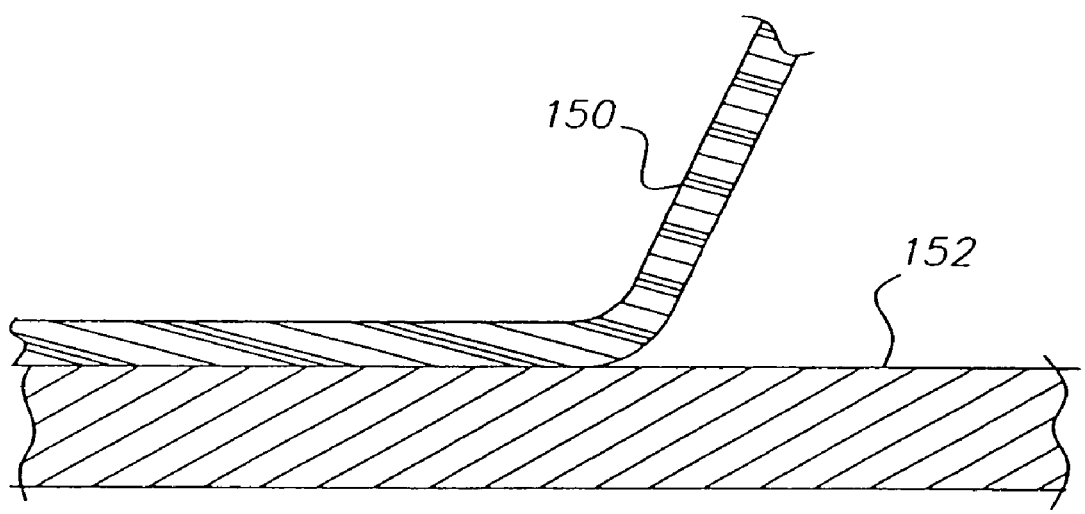
FIG. 4 shows a cross-sectional representation of a single-layer polycarbonate film partially peeled from a carrier substrate and formed by the method of the present invention.
Figure 5:
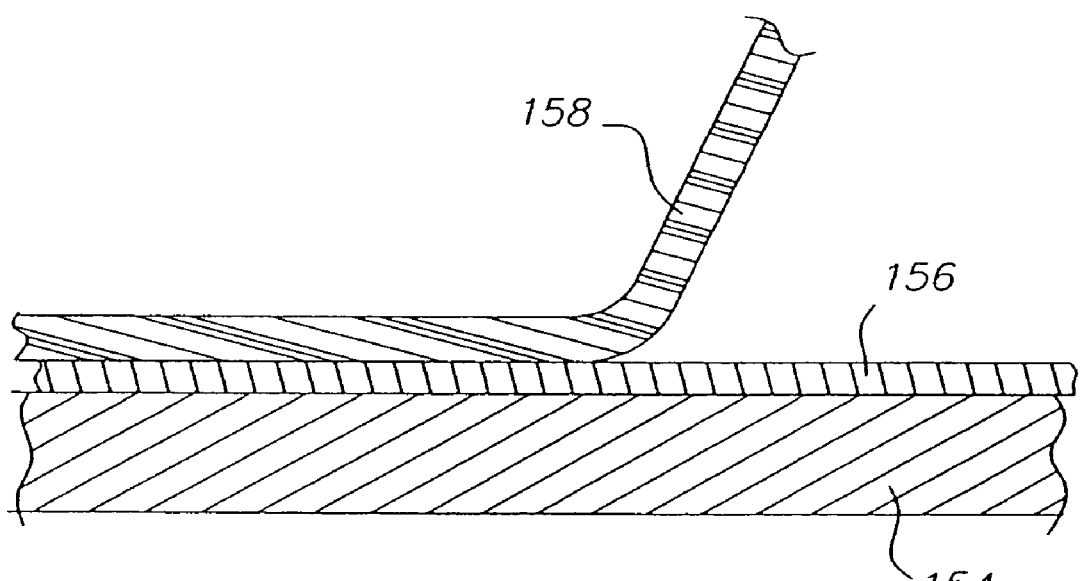
FIG. 5 shows a cross-sectional representation of a single-layer polycarbonate film partially peeled from a carrier substrate and formed by the method of the present invention wherein the carrier substrate has a subbing layer formed thereon.
Figure 6:
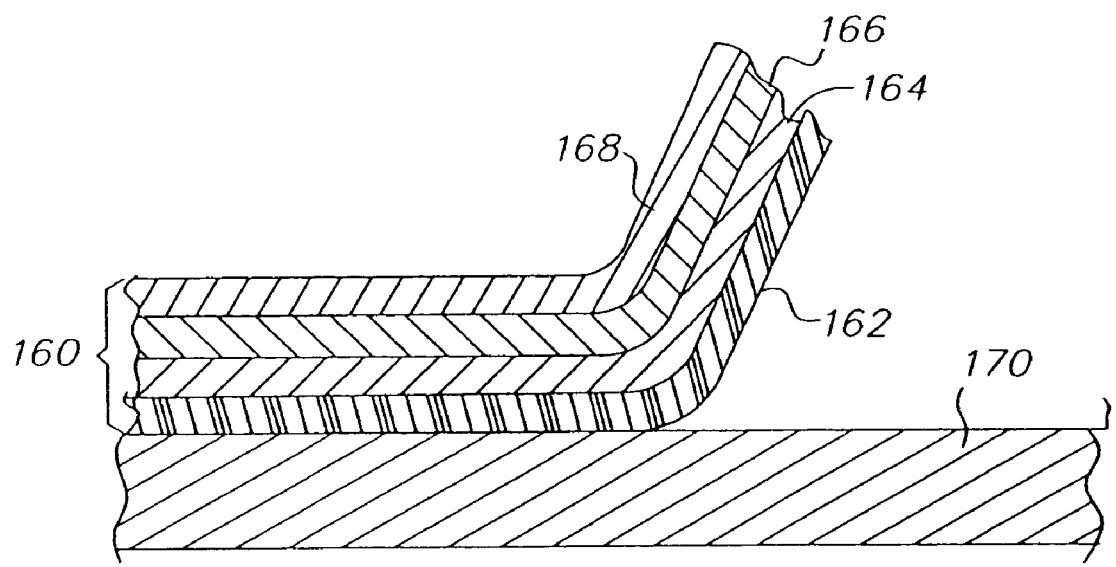
FIG. 6 shows a cross-sectional representation of a multi-layer polycarbonate film partially peeled from a carrier substrate and formed by the method of the present invention.
Figure 7:
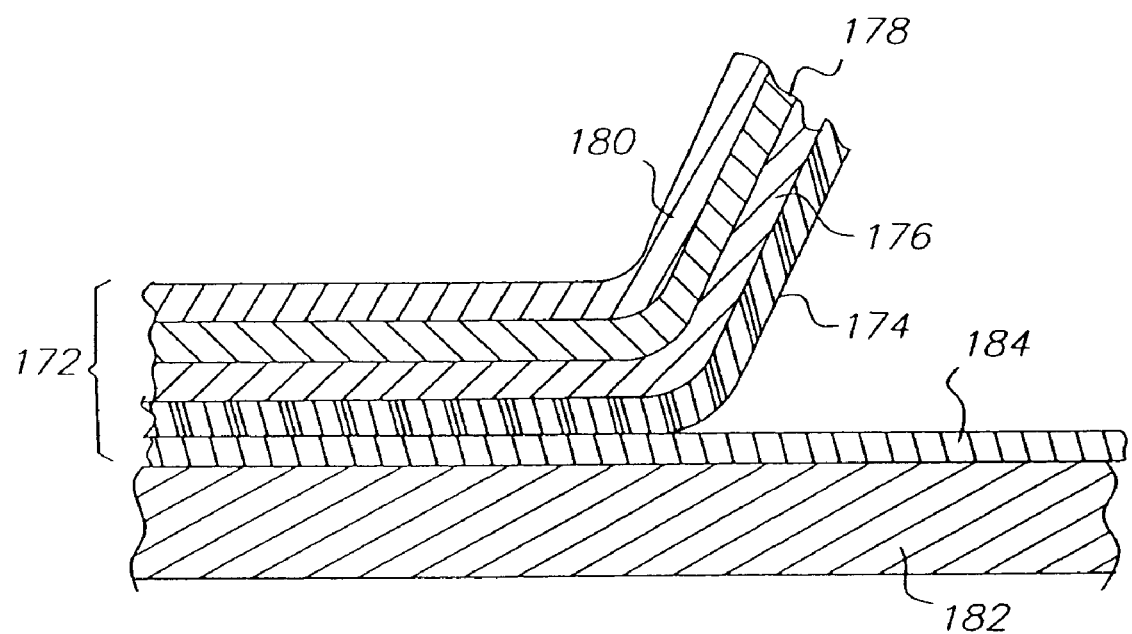
FIG. 7 shows a cross-sectional representation of a multi-layer polycarbonate film partially peeled from a carrier substrate and formed by the method of the present invention wherein the carrier substrate has a subbing layer formed thereon.

Turning next to FIGS. 4 through 7, there are presented cross-sectional illustrations showing various film configurations prepared by the method of the present invention. In FIG. 4, a single-layer polycarbonate film 150 is shown partially peeled from a carrier substrate 152. Polycarbonate film 150 may be formed either by applying a single liquid layer to the carrier substrate 152 or by applying a multiple layer composite having a composition that is substantially the same among the layers. Alternatively in FIG. 5, the carrier substrate 154 may have been pretreated with a subbing layer 156 that modifies the adhesive force between the single layer polycarbonate film 158 and the substrate 154. FIG. 6 illustrates a multiple layer film 160 that is comprised of four compositionally discrete layers including a lowermost layer 162 nearest to the carrier support 170, two intermediate layers 164, 166, and an uppermost layer 168. FIG. 6 also shows that the entire multiple layer composite 160 may be peeled from the carrier substrate 170. FIG. 7 shows a multiple layer composite film 172 comprising a lowermost layer 174 nearest to the carrier substrate 182, two intermediate layers 176, 178, and an uppermost layer 180 being peeled from the carrier substrate 182. The carrier substrate 182 has been treated with a subbing layer 184 to modify the adhesion between the composite film 172 and substrate 182. Subbing layers 156 and 184 may be comprised of a number of polymeric materials such as polyvinylbutyrals, cellulosics, acrylics, gelatin and poly(acrylonitrile-co-vinylidene chloride-co-acrylic acid). The choice of materials used in the subbing layer may be optimized empirically by those skilled in the art.

The method of the present invention may also include the step of coating over a previously prepared composite of polycarbonate film and carrier substrate. For example, the coating and drying system 10 shown in FIGS. 1 and 2 may be used to apply a second multi-layer film to an existing polycarbonate film/substrate composite. If the film/substrate composite is wound into rolls before applying the subsequent coating, the process is called a multi-pass coating operation. If coating and drying operations are carried out sequentially on a machine with multiple coating stations and drying ovens, then the process is called a tandem coating operation. In this way, thick films may be prepared at high line speeds without the problems associated with the removal of large amounts of solvent from a very thick wet film. Moreover, the practice of multi-pass or tandem coating also has the advantage of minimizing other artifacts such as streak severity, mottle severity, and overall film nonuniformity.

The practice of tandem coating or multi-pass coating requires some minimal level of adhesion between the first-pass film and the carrier substrate. In some cases, film/substrate composites having poor adhesion are observed to blister after application of a second or third wet coating in a multi-pass operation. To avoid blister defects, adhesion must be greater than 0.3 N/m between the first-pass polycarbonate film and the carrier substrate. This level of adhesion may be attained by a variety of web treatments including various subbing layers and various electronic discharge treatments. However, excessive adhesion between the applied film and substrate is undesirable since the film may be damaged during subsequent peeling operations. In particular, film/substrate composites having an adhesive force of greater than 250 N/m have been found to peel poorly. Films peeled from such excessively, well-adhered composites exhibit defects due to tearing of the film and/or due to cohesive failure within the film. In a preferred embodiment of the present invention, the adhesion between the polycarbonate film and the carrier substrate is less than 250 N/m. Most preferably, the adhesion between polycarbonate film and the carrier substrate is between 0.5 and 25 N/m.

The method of the present invention is suitable for application of polycarbonate resin coatings to a variety of substrates such as polyethylene terephthalate (PET), polyethylene naphthalate (PEN), polystyrene, and other polymeric films. Polymeric substrates may be unstretched, uniaxially stretched or biaxially stretched prior to application of the polycarbonate coatings. Additional substrates may include paper, laminates of paper and polymeric films, glass, cloth, aluminum and other metal supports. In some cases, substrates may be pretreated with subbing layers or electrical discharge devices. Substrates may also be pretreated with functional layers containing various binders and addenda.

Figure 8:
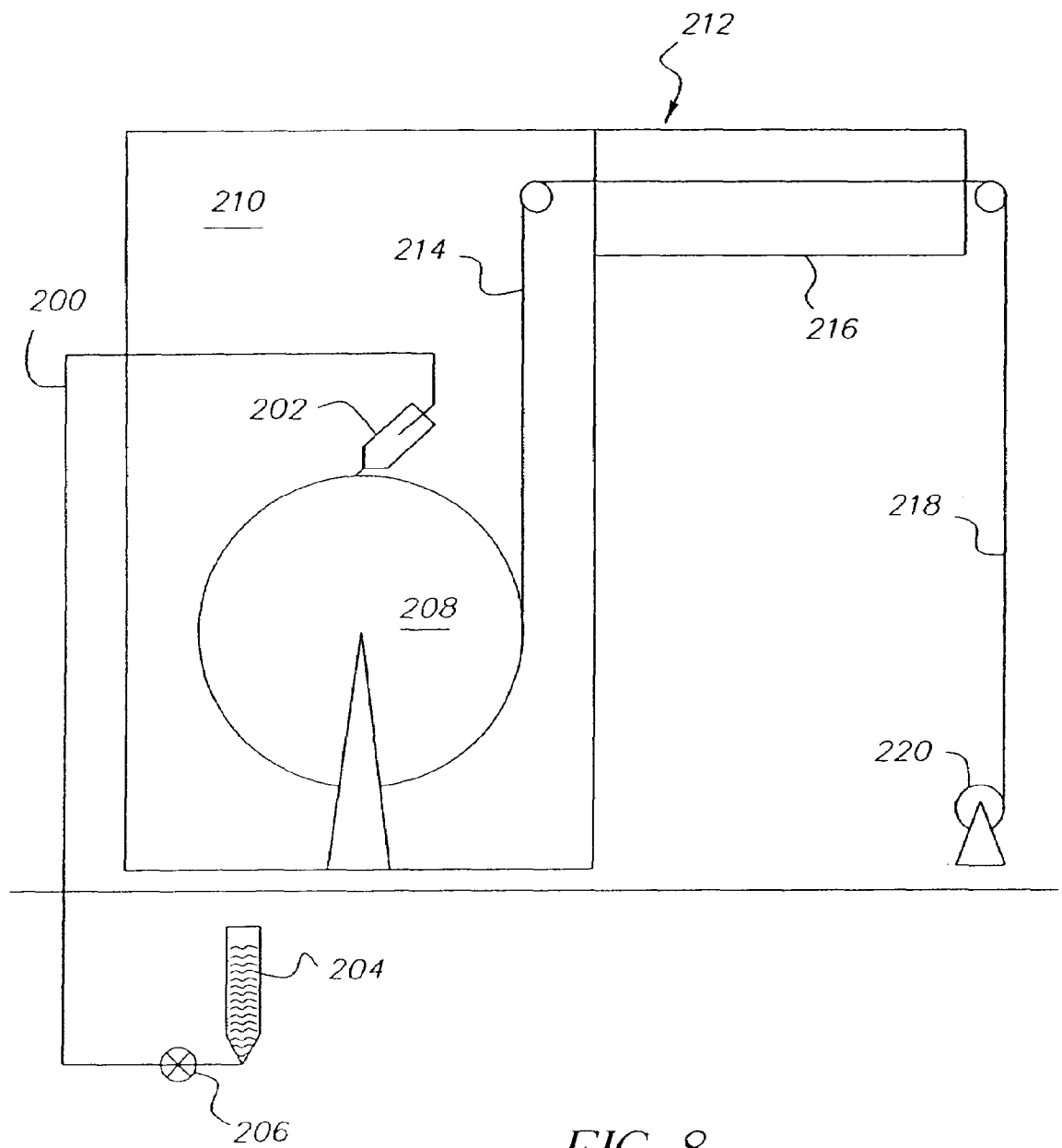
FIG. 8 is a schematic of a casting apparatus as used in prior art to cast polycarbonate films.

The prior art method of casting resin films is illustrated in FIG. 8. As shown in FIG. 8, a viscous polymeric dope is delivered through a feed line 200 to an extrusion hopper 202 from a pressurized tank 204 by a pump 206. The dope is cast onto a highly polished metal drum 208 located within a first drying section 210 of the drying oven 212. The cast film 214 is allowed to partially dry on the moving drum 208 and is then peeled from the drum 208. The cast film 214 is then conveyed to a final drying section 216 to remove the remaining solvent. The final dried film 218 is then wound into rolls at a wind-up station 220. The prior art cast film typically has a thickness in the range of from 40 to 200 μm.

Coating methods are distinguished from casting methods by the process steps necessary for each technology. These process steps in turn affect a number of tangibles such as fluid viscosity, converting aids, substrates, and hardware that are unique to each method. In general, coating methods involve application of dilute low viscosity liquids to thin flexible substrates, evaporating the solvent in a drying oven, and winding the dried film/substrate composite into rolls. In contrast, casting methods involve applying a concentrated viscous dope to a highly polished metal drum or band, partially drying the wet film on the metal substrate, stripping the partially dried film from the substrate, removing additional solvent from the partially dried film in a drying oven, and winding the dried film into rolls. In terms of viscosity, coating methods require very low viscosity liquids of less than 5,000 cp. In the practice of the method of the present invention the viscosity of the coated liquids will generally be less than 2000 cp and most often less than 1500 cp. Moreover, in the method of the present invention the viscosity of the lowermost layer is preferred to be less than 200 cp. and most preferably less than 100 cp. for high speed coating application. In contrast, casting methods require highly concentrated dopes with viscosity on the order of 10,000-100,000 cp for practical operating speeds. In terms of converting aids, coating methods generally involve the use of surfactants as converting aids to control flow after coating artifacts such as mottle, repellencies, orange peel, and edge withdraw. In contrast, casting methods do not require surfactants. Instead, converting aids are only used to assist in the stripping and conveyance operations in casting methods. For example, lower alcohols are sometimes used as converting aids in cast polycarbonate films to minimize abrasion artifacts during conveyance through drying ovens. In terms of substrates, coating methods generally utilize thin (10-250 micron) flexible supports. In contrast, casting methods employ thick (1-100 mm), continuous, highly polished metal drums or rigid bands. As a result of these differences in process steps, the hardware used in coating is conspicuously different from those used in casting as can be seen by a comparison of the schematics shown in FIGS. 1 and 8, respectively.

The advantages of the present invention are demonstrated by the following practical examples given below. In these examples, the polycarbonate (PC) was the Bisphenol-A homopolymer with a weight average molecular weight of 54,000 daltons as determined with polystyrene equivalent weight distributions using size exclusion chromatography.

Example 1

This example describes the single pass formation of a very thin polycarbonate film. The coating apparatus 16 illustrated in FIG. 1 was used to apply four liquid layers to a moving substrate 12, 170 of untreated polyethylene terephthalate (PET) to form a single layer film as illustrated earlier in FIG. 6. The substrate speed was 25 cm/s. All coating fluids were comprised of PC dissolved in methylene chloride. The lowermost layer 162 had a viscosity of 17 cp. and a wet thickness of 14 µm on the moving substrate 170. The second 164 and third 166 layers each had a viscosity of 660 cp. and had a combined final wet thickness of 27 µm on the moving substrate 170. In addition, the third layer 166 also contained a fluorinated surfactant (Surflon S8405) at concentration of 0.02%. The uppermost layer 168 had a viscosity of 107 cp. and a wet thickness of 22 µm on the moving substrate 170. The uppermost layer 168 also contained a fluorinated surfactant (Surflon S8405) at a weight percent of 0.10%. Coatings were applied at a temperature of 16° C. The gap between the coating lip 136 and the moving substrate 12 (see FIG. 3) was 200 µm. The pressure differential across the coating bead 146 was adjusted between 0-10 cm of water to establish a uniform coating. The temperature in the drying sections 66 and 68 was 40° C. The temperature in the drying section 70 was 50° C. The temperature in the drying sections 72, 74, 76, 78, 80 was 120° C. The temperature in the drying section 82 was 25° C. The composite of PC film and PET substrate was wound into rolls. When peeled from the untreated PET substrate, the final dry film had a thickness of 10 µm. The peeled PC film was free from scratch and wrinkle artifacts and had an in-plane retardation of less than 5.0 nm. Properties of this polycarbonate film are summarized in Table I.

Example 2

This example describes the single pass formation of a thin PC film. The conditions were identical to those described in Example 1 except that the combined wet thickness of the second and third layers 164 and 166 was increased to 73 µm. The composite of PC film and PET substrate was wound into rolls. When peeled from the subbed PET substrate, the final dry film had a thickness of 20 µm. The peeled PC film had a good appearance, was smooth, was free from scratch and wrinkles artifacts, and had an in-plane retardation of less than 5.0 nm. Properties of this PC film are summarized in Table I.

Example 3

This example describes the single pass formation of a thin PC film. The conditions were identical to those described in Example 1 except that the combined wet thickness of the second and third layers 164 and 166 was increased to 120 µm. The composite of PC film and PET substrate was wound into rolls. When peeled from the subbed PET substrate, the final dry film had a thickness of 30 µm. The PC film had a good appearance, was smooth, was free from scratch and wrinkle artifacts, and had an in-plane retardation of less than 5.0 nm. Properties of this PC film are summarized in Table I.

Example 4

This example describes the single pass formation a PC film. The conditions were identical to those described in Example 1 except that the combined wet thickness of the second and third layers 164 and 166 was increased to 166 µm. The composite of PC film and PET substrate was wound into rolls. When peeled from the subbed PET substrate, the final dry film had a thickness of 40 µm. The peeled PC film had a good appearance, was smooth, was free from scratch and wrinkle artifacts, and had an in-plane retardation of less than 5.0 nm. Properties of this PC film are summarized in Table I.

Example 5

This example describes the formation of a thin PC film using two pass coating operation. The conditions were identical to those described in Example 1 except that the wound composite of PC film and PET substrate of Example 1 was subsequently over-coated with an additional pass. The second pass was conducted with the combined wet thickness of the second and third layers at 27 µm as described in Example 1. The composite of PC film and PET substrate was wound into rolls. When peeled from the untreated PET substrate, the final dry film had a thickness of 20 µm. The peeled PC film had a good appearance, was smooth, was free from scratch and wrinkle artifacts, and bad an in-plane retardation of less than 5.0 nm. Properties of this polycarbonate film are summarized in Table I.

Example 6

This example describes the formation of a PC film using a three-pass coating operation. The conditions were identical to those described in Example 2 except that the wound composite of PC film and PET substrate of Example 2 was subsequently over-coated with two additional passes. Each additional pass was conducted with the combined wet thickness of the second and third layers at 73 µm as described in Example 2. The final composite of PC film and PET substrate was wound into rolls. The final dry film had a thickness of 60 µm. The peeled PC film was smooth, was free from scratch and wrinkle artifacts, and had an in-plane retardation of less than 5.0 nm. Properties of this PC film are summarized in Table I.

Example 7

This example describes the formation of a PET/PC composite having optimal peeling properties. In this example, the PET support has a subbing layer applied to the coated side. The subbing layer is polyvinylbutyral (~12% vinyl alcohol content) having a dry thickness of 10 µm and a surfactant content of 500 mg/sq-m of Surflon S-8405. This polyvinylbutyral layer is adhered to the subbed PET substrate. Otherwise, the conditions were identical to those described in Example 2. The final composite of PC film and subbed PET substrate was wound into rolls. The final dry film had a thickness of 20 µm. When peeled from the subbed PET substrate, the PC film was found to separate very smoothly from the carrier support. The average adhesive strength of the PC film to the subbed PET substrate was found to be 1.8 N/m with a standard deviation of 0.4 N/m. This smooth peeling process contrasted noticeably with the more hesitant peeling properties of the untreated PET substrate described earlier in Example 2. For untreated PET substrate of Example 2, the average adhesive strength of the PC film to the subbed PET substrate was found to be 3.0 N/m with a higher standard deviation of 1.4 N/m. This feature of smooth peeling is reflected in the smaller standard deviation values found with the adhesion measurements. Similar results where observed with thicker PC films of 40 microns. For 40 micron PC films prepared under the conditions of Example 4, samples prepared using untreated PET and the polyvinylbutyral subbed PET described here in Example 7 had standard deviations of adhesive strength of 2.5 and 0.1 N/m, respectively. The PET substrate treated with the polyvinylbutyral subbing layer displayed very smooth peel characteristics having very low standard deviation values of adhesive strength.

Comparative Example 1

This example describes the formation of a PET/PC composite having poor peeling properties. In this example, the PET support has a subbing layer of poly(acrylonitrile-co-vinylidene chloride-co-acrylic acid) with a dry coverage of 100 mg/sq-m. Otherwise, the conditions for Comparative Example 1 were identical to those described in Example 1. The final dry film had a thickness of 20 μm. When dried, the PC film could not be peeled from the subbed PET substrate. For this composite film, the adhesive strength of the PC film to the subbed PET substrate was greater than 250 N/m.

Comparative Example 2

This example describes defects formed as a result of poor drying conditions during a single pass operation. The conditions for Comparative Example 2 were identical to those described in Example 2 except that the drying conditions were adjusted such that the temperature in the first three drying zones 66, 68, 70 was decreased to 25° C. When peeled from the subbed PET substrate, the final dry film had a thickness of 20 μm. The peeled PC film was of unacceptable quality due to fogging of the film.

Comparative Example 3

This example describes defects formed as a result of poor drying conditions during a single pass operation. The conditions for Comparative Example 3 were identical to those described in Example 2 except that the drying conditions were adjusted such that the temperature in the first three drying zones 66, 68, 70 was increased to 95° C. When peeled from the subbed PET substrate, the final dry film had a thickness of 20 μm. The peeled PC film was of unacceptable quality due to a reticulation pattern in the film as well as to blister artifacts.

TABLE I

| Example | Thickness | Retardation | Transmittance | Haze | Roughness |
|---------|-----------|-------------|---------------|------|-----------|
| 1 | 10 μm | 2.0 nm | 92.1% | 1.0% | 1.3 nm |
| 2 | 20 | 3.8 | 92.0 | 1.0 | 1.0 |
| 3 | 30 | 2.5 | 92.3 | 0.8 | 0.9 |
| 4 | 40 | 2.8 | 92.3 | 0.7 | 0.7 |
| 5 | 20 | 3.8 | 92.0 | 0.6 | 1.1 |
| 6 | 60 | 4.5 | 92.1 | 0.8 | 0.7 |

The following tests were used to determine the film properties given in Table I.

Thickness. Thickness of the final peeled film was measured in microns using a Model EG-225 gauge from the Ono Sokki Company.

Retardation. In-plane retardation ($R_e$) of peeled films were determined in nanometers (nm) using a Woollam M-2000V Spectroscopic Ellipsometer at wavelengths from 370 to 1000 nm. In-plane retardation values in Table I are computed for measurements taken at 590 nm. In-plane retardation is defined by the formula:

$$R_e = |n_x - n_y| \times d$$

where $R_e$ is the in-plane retardation at 590 nm, $n_x$ is the index of refraction of the peeled film in the slow axis direction, $n_y$ is the index of refraction of the peeled film in the fast axis direction, and d is the thickness of the peeled film in nanometers (nm). Thus, $R_e$ is the absolute value of the difference in birefringence between the slow axis direction and the fast axis direction in the plane of the peeled film multiplied by the thickness of the film.

Transmittance and Haze. Total transmittance and haze are measured using the Haze-Gard Plus (Model HB-4725) from BYK-Gardner. Total transmittance is all the light energy transmitted through the film as absorbed on an integrating sphere. Transmitted haze is all light energy scattered beyond 2.5° as absorbed on an integrating sphere.

Surface Roughness. Surface roughness was determined in nanometers (nm) by scanning probe microscopy using TappingMode™ Atomic Force Microscopy (Model D300 from Digital Instruments).

Adhesion. The adhesion strength of the coated samples was measured in Newtons per meter (N/m) using a modified 180° peel test with an Instron 1122 Tensile Tester with a 500 gram load cell. First, 0.0254 m (one inch) wide strips of the coated sample were prepared. Delamination of the coating at one end was initiated using a piece of 3M Magic Tape. An additional piece of tape was then attached to the delaminated part of the coating and served as the gripping point for testing. The extending tape was long enough to extend beyond the support such that the Instron grips did not interfere with the testing. The sample was then mounted into the Instron 1122 Tensile Tester with the substrate clamped in the upper grip and the coating/tape assembly clamped in the bottom grip. The average force (in units of Newtons) required to peel the coating off the substrate at a 180° angle at speed of 2 inches/min (50.8 mm/min) was recorded. Using this force value the adhesive strength in units of N/m was calculated using the equation:

$$S_A = F_p (1 - \cos \theta)/w$$

wherein $S_A$ is the adhesive strength, $F_p$ is the peel force, θ is the angle of peel (180°), and w is the width of the sample (0.0254 m).

Residual Solvent. A qualitative assessment of residual solvents remaining in a dried film is done by first peeling the film from the carrier substrate, weighing the peeled film, incubating the film in an oven at 150° C. for 16 hours, and finally weighing the incubated film. Residual solvent is expressed as percentage of the weight difference divided by the post-incubation weight.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

| PARTS LIST: | |
|---|---|
| 10 | coating and drying system |
| 12 | moving substrate/web |
| 14 | dryer |
| 16 | coating apparatus |
| 18 | unwinding station |
| 20 | back-up roller |
| 22 | coated web |
| 24 | dry film |
| 26 | wind up station |
| 28 | coating supply vessel |
| 30 | coating supply vessel |
| 32 | coating supply vessel |
| 34 | coating supply vessel |
| 36 | pumps |
| 38 | pumps |
| 40 | pumps |
| 42 | pumps |
| 44 | conduits |
| 46 | conduits |
| 48 | conduits |
| 50 | conduits |
| 52 | discharge device |
| 54 | polar charge assist device |
| 56 | opposing rollers |
| 58 | opposing rollers |
| 60 | polycarbonate film |
| 62 | winding station |
| 64 | winding station |
| 66 | drying section |
| 68 | drying section |
| 70 | drying section |
| 72 | drying section |
| 74 | drying section |
| 76 | drying section |
| 78 | drying section |
| 80 | drying section |
| 82 | drying section |
| 92 | front section |
| 94 | second section |
| 96 | third section |
| 98 | fourth section |
| 100 | back plate |
| 102 | inlet |
| 104 | metering slot |
| 106 | pump |
| 108 | lower most layer |
| 110 | inlet |
| 112 | $2^{nd}$ metering slot |
| 114 | pump |
| 116 | layer |
| 118 | inlet |
| 120 | metering slot |
| 122 | pump |
| 124 | form layer |
| 126 | inlet |
| 128 | metering slot |
| 130 | pump |
| 132 | layer |
| 134 | incline slide surface |
| 136 | coating lip |
| 138 | $2^{nd}$ incline slide surface |
| 140 | $3^{rd}$ incline slide surface |
| 142 | $4^{th}$ incline slide surface |
| 144 | back land surface |
| 146 | coating bead |
| 150 | polycarbonate film |
| 152 | carrier substrate |
| 154 | carrier substrate |

-continued

| PARTS LIST: | |
|---|---|
| 156 | subbing layer |
| 158 | polycarbonate film |
| 160 | multiple layer film |
| 162 | lower most layer |
| 164 | intermediate layers |
| 166 | intermediate layers |
| 168 | upper most layer |
| 170 | carrier support |
| 172 | composite film |
| 174 | lower most layer |
| 176 | intermediate layers |
| 178 | intermediate layers |
| 180 | upper most layers |
| 182 | carrier substrate |
| 184 | subbing layer |
| 200 | feed line |
| 202 | extrusion hopper |
| 204 | pressurized tank |
| 206 | pump |
| 208 | metal drum |
| 210 | drying section |
| 212 | drying oven |
| 214 | cast film |
| 216 | final drying section |
| 218 | final dried film |
| 220 | wind-up station |

What is claimed is:

1. A coating method for forming a polycarbonate film consisting essentially of the steps of:
    (a) applying a multi-layer composite comprising a liquid polycarbonate/solvent mixture onto a moving, discontinuous carrier substrate, where the multi-layer composite comprises multiple layers of coating fluids, each layer comprising a polycarbonate resin dissolved in solvent, wherein the viscosity of each layer of the multi-layer composite is less than 5,000 cp and the lowermost layer of the multi-layer composite comprises the polycarbonate in a concentration adjusted to achieve a viscosity of less than 100 cp; and
    (b) drying the liquid polycarbonate/solvent mixture to substantially remove the solvent to obtain a residual solvent content of less than 5% by weight yielding a composite of a dried polycarbonate film having an in-plane retardation of less than 20 nm adhered to the discontinuous carrier substrate, the polycarbonate film being releasably adhered to the discontinuous carrier substrate with an adhesive strength of less than about 250 N/m thereby allowing the polycarbonate film to be peeled from the discontinuous carrier substrate,
    wherein all coated layers of said dried polycarbonate composite film have substantially the same polycarbonate.

2. A coating method as recited in claim 1 wherein: the liquid polycarbonate/solvent mixture is applied using slide bead coating die with a multi-layer composite being formed on a slide surface thereof.

3. A coating method as recited in claim 1 wherein: the carrier substrate is polyethylene terephthalate.

4. A coating method as recited in claim 1 wherein: the carrier substrate is pre-treated with a subbing layer to modify adhesion between the polycarbonate film and the carrier substrate.

5. A coating method as recited in claim 2 wherein: an uppermost layer of the multi-layer composite contains a surfactant.

6. A coating method as recited in claim 1 wherein: drying of the coated liquid polycarbonate/solvent mixture is performed in at least first and second independent drying sections, where the first drying section is operated at a temperature between 25 and 95° C.

7. A coating method as recited in claim 1 further comprising the step of: winding the composite into at least one roll before the polycarbonate sheet is peeled from the discontinuous carrier substrate.

8. A coating method as recited in claim 1 further comprising the steps of:
   (a) separating the polycarbonate film from the carrier substrate immediately after the drying step; and
   (b) winding the polycarbonate film into at least one roll.

9. A coating method as recited in claim 7 further comprising the step of:
   (a) unwinding at least a portion of at least one roll of the composite; and
   (b) separating the polycarbonate film from the carrier substrate.

10. A coating method as recited in claim 8 further comprising the step of: reducing residual solvent in the polycarbonate film to less than 1% by weight prior to the separating step.

11. A coating method as recited in claim 9 further comprising the step of: reducing residual solvent in the polycarbonate film to less than 1% by weight prior to the separating step.

12. A coating method as recited in claim 7 further comprising the step of: delivering the composite to a user of the polycarbonate film, the carrier substrate acting as a protective support for the polycarbonate film prior to the polycarbonate film being separated from the substrate carrier.

13. A coating method as recited in claim 1 further comprising the step of: including a plasticizer in the liquid polycarbonate/solvent mixture.

14. A coating method as recited in claim 1 wherein: the polycarbonate film has an in-plane retardation of less than 10 nm.

15. A coating method as recited in claim 1 wherein: the polycarbonate film has an in-plane retardation of less than 5.0 nm.

16. A coating method as recited in claim 1 further comprising the step of: applying at least one additional polycarbonate layer to the composite after the drying step.

17. A coating method as recited in claim 1 wherein: the polycarbonate film has a thickness in the range of 1 to 500 μm.

18. A coating method as recited in claim 1 further comprising the step of: using the polycarbonate film to form a light polarizer.

19. A coating method as recited in claim 2 wherein: an uppermost layer of the multi-layer composite contains a fluorinated surfactant.

20. A coating method as recited in claim 2 wherein: an uppermost layer of the multi-layer composite contains a polysiloxane surfactant.

21. A coating method as recited in claim 6 wherein: the drying step is initially performed at a temperature in the range of from about 30° C. to about 60° C.

22. A coating method as recited in claim 6 wherein: the drying step is initially performed at a temperature in the range of from about 30° C. to about 50° C.

23. A coating method as recited in claim 1 wherein: the polycarbonate film has a light transmittance of at least about 85 percent and a haze value of less than about 1.0 percent.

24. A coating method as recited in claim 1 wherein: the polycarbonate film has an average surface roughness of less than about 100 nm.

25. A coating method as recited in claim 1 wherein: the polycarbonate film has an average surface roughness of less than about 50 inn.

26. A coating method as recited in claim 1 wherein: the polycarbonate film has an average surface roughness of not more than about 1 nm.

27. A coating method as recited in claim 1 wherein: the polycarbonate film has a thickness of less than 40 μm.

28. A coating method as recited in claim 15 wherein: the polycarbonate film has a thickness of less than 40 μm.

29. A coating method as recited in claim 1 wherein: the polycarbonate film formed on the carrier substrate is releasably adhered to the carrier substrate with an adhesive strength of between 0.5 and 25 N/m.

* * * * *